United States Patent [19]
Tsunemiya et al.

[11] Patent Number: 5,485,262
[45] Date of Patent: Jan. 16, 1996

[54] DISTANCE MEASURING APPARATUS, HAVING PLURAL POSITIONING SENSORS TO MEASURE DIFFERENT DISTANCE RANGES

[75] Inventors: Takanobu Tsunemiya; Masanori Ohtsuka, both of Yokohama, Japan

[73] Assignee: Canon Kabushiki Kaisha, Tokyo, Japan

[21] Appl. No.: 141,682

[22] Filed: Oct. 26, 1993

Related U.S. Application Data

[63] Continuation of Ser. No. 921,637, Jul. 30, 1992.

[30] Foreign Application Priority Data

Aug. 2, 1991 [JP] Japan .................................. 3-194108
Jan. 31, 1992 [JP] Japan .................................. 4-040730

[51] Int. Cl.⁶ .............................. G01C 3/00; G01C 5/00
[52] U.S. Cl. ..................... 356/3.08; 354/403; 356/3.04
[58] Field of Search ........................... 356/1, 3.04, 3.08; 354/403

[56] References Cited

U.S. PATENT DOCUMENTS

| | | | |
|---|---|---|---|
| 4,582,424 | 4/1986 | Kawabata | 356/1 |
| 4,941,009 | 7/1990 | Yoshida | 354/402 |
| 5,099,266 | 3/1992 | Nakajima et al. | 354/403 |
| 5,172,155 | 12/1992 | Kosaka | 354/403 |
| 5,210,585 | 5/1993 | Suzuki | 356/1 |

FOREIGN PATENT DOCUMENTS 0009013  1/1983  Japan .......................... 356/4

*Primary Examiner*—Stephen C. Buczinski
*Attorney, Agent, or Firm*—Fitzpatrick, Cella, Harper & Scinto

[57] ABSTRACT

A distance measuring apparatus includes a first light projecting device for projecting a light to a projection range, and a first light receiving device arranged along a base length direction thereof, for receiving a reflection light of the light projected from the first light projecting device. The first light receiving device has a first position sensor to detect, in accordance with a position of light reception, a distance to an object, the object being located at least within a middle distance. A second light projecting device, provided independent of the first light projecting device, projects a light to substantially the same projection range as the first light projecting device. A second light receiving device, arranged in a direction different from the base length direction of the first light receiving device, receives a reflection light of the light projected from the second light projecting device. The second light receiving device includes (i) a second position sensor to detect, in accordance with a position of light reception, a distance to an object, the object being located at least within a near distance range, and (ii) a third sensor, disposed at a position corresponding to light reception for an object which is located within a far distance range, to detect a distance to the object in the far distance range.

75 Claims, 8 Drawing Sheets

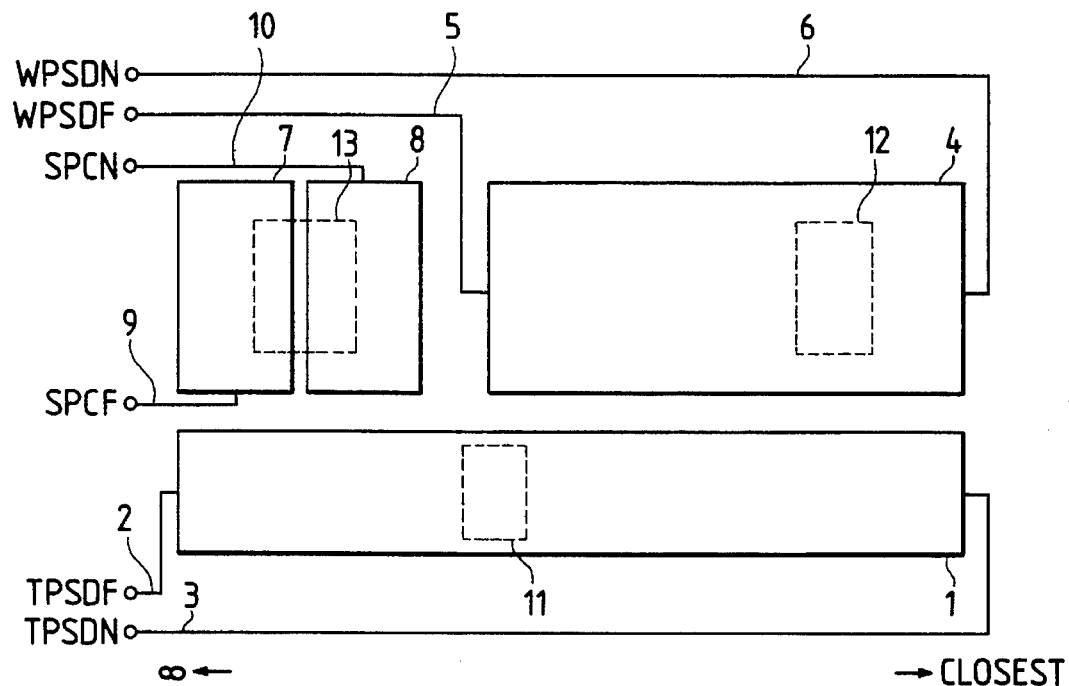
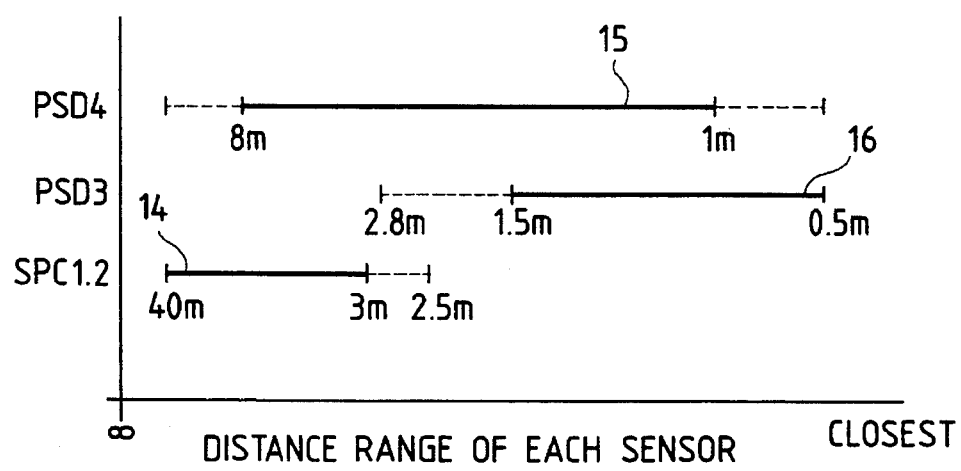

5,485,262

DISTANCE MEASURING APPARATUS, HAVING PLURAL POSITIONING SENSORS TO MEASURE DIFFERENT DISTANCE RANGES

This application is a continuation of application Ser. No. 07/921,637 filed Jul. 30, 1992.

BACKGROUND OF THE INVENTION

1. Field of the Invention

The present invention relates to a distance measuring apparatus of a so-called active type, in which a distance to an object is measured by projecting a signal and receiving a reflection signal thereof.

2. Description of the Related Art

In a distance measuring apparatus of a so-called active type conventionally well known in the camera arts or the like, a distance to a subject to be photographed is detected based on a principle of triangulation by projecting a signal light towards the subject and receiving a reflection light of the signal light.

Recently, a new distance measuring apparatus of the active type which has become popular uses a position semiconductor detector (PSD) as light receiving means for receiving the reflection light and can measure a distance without a moving portion.

The PSD outputs a signal according to a centroid position of a spot light received. Thus the PSD does not need uniformity of a projection image and allows a wide range of distance measurement. However, since the PSD has a resistance layer, resistance noises are unavoidable. A S/N ratio becomes worse for a far subject with a reduction in light the amount of reflection light, thereby decreasing the accuracy of distance measurement. Especially, the reduction in accuracy of distance measurement for a far subject has been a big problem with recent appearance of zoom cameras which permit far distance photography.

A solution to the above problem involves a method using a pair of bisectional silicon photo cells (SPC), in which a position of light reception of reflection light is detected by a ratio of outputs therefrom. However, if the SPC pair is used to cover the entire range of distance measurement from near to far, a sufficient base line length cannot be assured, thereby causing a disadvantage of reduction in the total accuracy of distance measurement.

Applicant proposed in U.S. Ser. No. 692,199 a distance measuring apparatus for measuring a distance to an object by projecting a signal and receiving a reflection signal thereof, which comprises first signal receiving means of a PSD for receiving a reflection signal of the signal reflected in a range from near to far distance, and second signal receiving means of a SPC pair for receiving a reflection signal of the signal reflected in a far distance, thereby increasing the accuracy of distance measurement on the far side and avoiding the reduction of total distance measurement accuracy.

The apparatus proposed has, however, a drawback of drops in distance measurement capability and in accuracy, because the reflection signal is received by both the first and the second signal receiving means, thereby decreasing an amount of signal to be received by each of the signal receiving means.

SUMMARY OF THE INVENTION

One aspect of the present invention is to provide a distance measuring apparatus, which measures a distance to an object by projecting a signal and receiving a reflection signal, comprising first signal projecting means for projecting a first signal, second signal projecting means for projecting a second signal, first signal receiving means for receiving a reflection signal of said first signal to principally measure a distance to an object existing in a middle range of distance, second signal receiving means for receiving a reflection signal of said second signal to principally measure a distance to an object existing in a near range of distance, and third signal receiving means for receiving said second reflection signal to principally measure a distance to an object existing in a far range of distance, to improve the accuracy of distance measurement in the near to far range without a reduction in total distance measurement accuracy.

Another aspect of the present invention is to provide a distance measuring apparatus comprising storing means for storing distance data obtained by at least three light receiving means, judging means for judging whether the distance data stored in the storing means are within distance measurable ranges of the respective light receiving means, and distance data output means for outputting, where a distance datum is judged by the judging means as being within a distance measurable range, said distance datum as a final distance datum, and for selecting, where a distance datum is judged as being out of the distance measurable ranges, a distance datum obtained by a predetermined light receiving means out of the distance data stored in the storing means to output the selected distance datum as a final distance datum. According to such an arrangement, the distance measuring apparatus may be prevented from being disabled in distance measurement and from being reduced in accuracy of distance measurement.

A further aspect of the present invention is to provide a distance measuring apparatus comprising storing means for storing distance data obtained by at least three light receiving means, judging means for judging whether the distance data stored in the storing means are within distance measurable ranges of the respective light receiving means, and distance data output means for outputting, where a distance datum is judged by the judging means as being within a distance measurable range, said distance datum as a final distance datum, and for outputting, where a distance datum is judged as being out of the distance measurable ranges, a predetermined distance datum preliminarily set as a final distance datum. According to such an arrangement, the distance measuring apparatus may be prevented from being disabled in distance measurement and from being reduced in accuracy of distance measurement.

A still further aspect of the present invention is to provide a distance measuring apparatus comprising storing means for storing distance data obtained by at least three light receiving means, judging means for judging whether the distance data stored in the storing means are within distance measurable ranges of the respective light receiving means, and distance data output means for outputting, where a distance datum is judged by the judging means as being within a distance measurable range, said distance datum as a final distance datum, and for selecting to evaluate and calculate, where a distance datum is judged as being out of the distance measurable ranges, distance data obtained by plural predetermined light receiving means out of the distance data stored in the storing means to output the obtained distance datum as a final distance datum. According to such an arrangement, the distance measuring apparatus may be prevented from being disabled in distance measurement and from being reduced in accuracy of distance measurement.

BRIEF DESCRIPTION OF THE DRAWINGS

FIG. 1 is an outline drawing to show an arrangement of light receiving sensors in the first embodiment of a distance measuring apparatus of an active type according to the present invention;

FIG. 2 is a drawing to show ranges of distance measurement of the light receiving sensors as shown in FIG. 1;

DETAILED DESCRIPTION OF THE PREFERRED EMBODIMENTS

Figure 3:
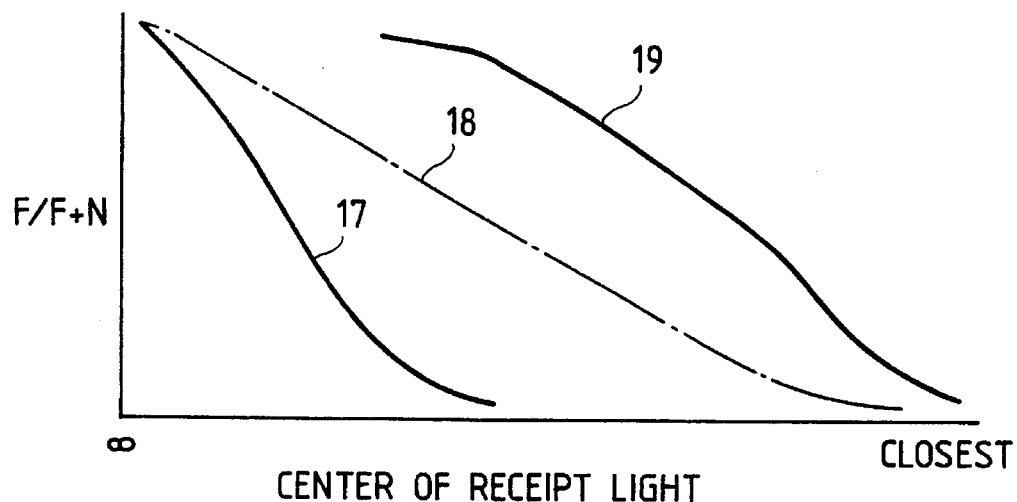
FIG. 3 is a drawing to show a relation between a ratio of output currents and a position of light reception for each light receiving sensor of FIG. 1.

FIG. 1 is an outline drawing to show an arrangement of light receiving sensors for receiving a reflection light of a signal light projected in a distance measuring apparatus of an active type according to a first embodiment of the present invention. In FIG. 1, reference numeral 1 denotes a first light receiving sensor composed of PSD-type sensor for mainly measuring a distance to an object existing in a middle range of distance as shown in FIG. 2, 2 a far side output lead wire of the first light receiving sensor 1, and 3 a near side output lead wire of the first light receiving sensor. Numeral 4 is a second light receiving sensor composed of PSD for mainly measuring a distance to an object existing in a near range of distance as shown in FIG. 2, 5 a far side output lead wire of the second light receiving sensor 4, and 6 a near side output lead wire of the second light receiving sensor. Numerals 7, denote bisectional SPC-type sensors constituting a third light receiving sensor for mainly measuring a distance to an object existing in a far range of distance as shown in FIG. 2. Numeral 9 is an output lead wire of far side SPC 7 of the third light receiving sensor 7, 8, and numeral 10 an output lead wire of near side SPC 8 of the third light receiving sensor 7, 8.

Numeral 11 denotes a received light spot image, which the first light receiving sensor 1 receives when a first signal light projected from a first light projection element as later described is reflected by an object in the middle distance range, and a position of light reception of the received light spot image 11 changes depending upon a distance to an object. As shown in FIG. 3, a ratio of currents output from the far side and the near side output lead wires 2, 3 of the first light receiving sensor 1 changes depending upon a position of light reception of the received light spot image 11. Distance information is obtained by operating the obtained ratio of currents through a circuit as later described. Numeral 12 is a received light spot image, which the second light receiving sensor 4 receives when a projection light projected from a second light projection element as later described is reflected by an object in a near distance range. Similarly as in the case of the above first light receiving sensor 1, distance information is obtained by calculating a position of the received light spot image from a ratio of output currents of the far side and the near side output lead wires 5, 6. Further, numeral 13 denotes a received light spot image, which tile third light receiving sensor 7, 8 receives when a projection light projected from the above second light projection element is reflected by an object in the far distance range. Similarly as in the cases of the above first and second light receiving sensors, a position of light reception of the received light spot image 13 changes depending upon a distance of the object, and a ratio of output currents of the output lead wires 9, 10 of the far side SPC 7 and the near side SPC 8 changes depending upon a change in position of light reception. Distance information is obtained based on tile change.

FIG. 2 shows ranges of distance measurement of the respective sensors of FIG. 1.

In FIG. 2, line 14 represents a distance measurement range of the third light receiving means 7, 8, line 15 a distance measurement range of the first light receiving means 1, and line 16 a distance measurement range of the second light receiving means 4. In the respective lines 14, 15, 16, a solid line represents a range of good distance measurement accuracy, and a broken line denotes a range of less than good but acceptable distance range.

FIG. 3 shows respective distance measurement ranges detectable by the respective sensors of FIG. 1.

In FIG. 3, 17 represents a distance measurement range of the third light receiving means 7, 8, 18 a distance measurement range of the first light receiving means 1, and 19 a distance measurement range of the second light receiving means 4.

Figure 4:
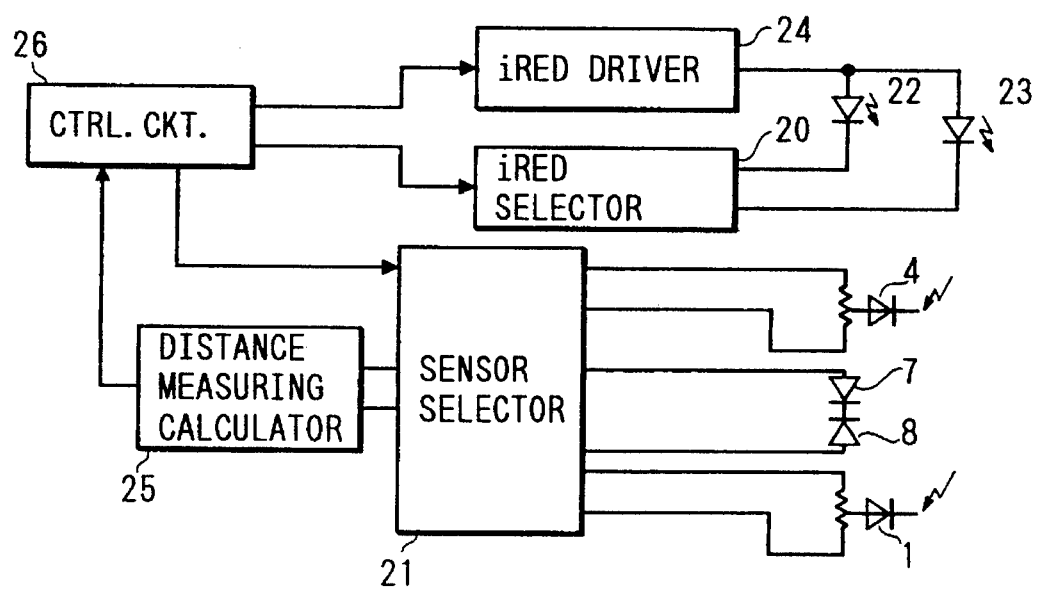
FIG. 4 is a circuit block diagram of the distance measuring apparatus using the light receiving sensors of FIG. 1.

FIG. 4 is a circuit block diagram for measuring a distance using the light receiving sensors of FIG. 1. In FIG. 4, reference numerals 22, 23 are the first and the second light projection elements as described, which project a signal light towards an object in the distance measurement range for distance measurement of the active type. Numeral 24 denotes a drive circuit for driving the first and the second light projection elements 22, 23, and numeral 20 a light projection element selection circuit for selecting light emission timing of the first and the second light projection elements 22, 23. Numerals 1, 4, 7, 8 designate the first, the second, the third light receiving sensors as explained with FIG. 1. The first light receiving sensor 1 for measuring a distance to an object existing mainly in the middle range of distance receives a reflection light of signal light projected by the first light projection element 22, and tile second and the third light receiving sensors 4 and 7, 8 for measuring a distance to an object existing mainly in the near distance range and in the far distance range, respectively, receive a reflection light of signal light projected by the second light projection element 23.

Numeral 21 denotes a light receiving sensor selection circuit for selecting one of the first, the second, and the third light receiving sensors, numeral 25 a distance measurement calculation circuit for calculating distance information to an object from an output of a light receiving sensor selected by the light receiving sensor selection circuit 21, and numeral 26 a control circuit composed of a microcomputer or the like for controlling the entire circuit of FIG. 4.

Figure 5:
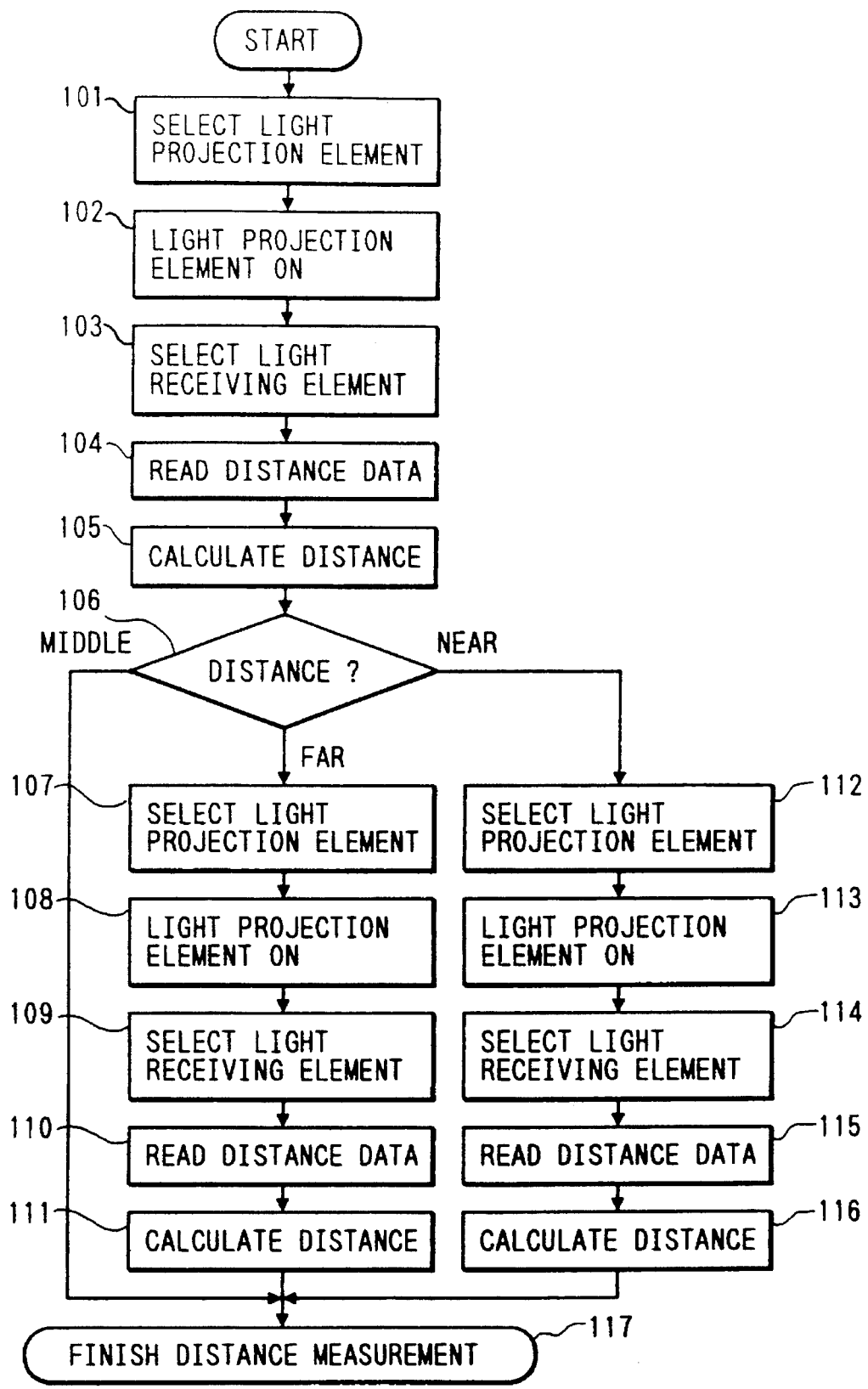
FIG. 5 is a flowchart to show an operation of the circuit of FIG. 4.

An operation of the circuit of FIG. 4 is next explained in accordance with a flowchart of FIG. 5 to show an operation of the control circuit 26.

First, the light projection element 22 is selected by the selection circuit 20 (#101), and a signal light is projected from the light projection element 22 by the drive circuit 24 (#102). Then, the first light receiving sensor is selected by the light receiving sensor selection circuit 21 (#103), output currents of the first light receiving sensor 1 are detected (#104), and distance information is obtained by the distance measurement calculation circuit 25 (#105). If the measurement result shows a middle range distance (#106), the distance measurement step #117 is completed. If the measurement result shows a far distance range processing steps #107–#117 are carried out. Specifically, the selection circuit 20 selects the light projection element 23 (#107), and a signal light is projected from the light projection element 23 by the drive circuit 24 (#108). Then the light receiving sensor selection circuit 21 selects the third light receiving sensor 7, 8 (#109), output currents of the third light receiving sensor 7, 8 are detected (#110), and distance information is calculated by the distance measurement calculation circuit 25 (#111), completing the distance measurement.

If the distance measurement result by the above light receiving sensor is a near distance range, processing steps #112 #117 are carried out. Specifically, the selection circuit 20 selects the light projection element 23 (#112), and a signal light is projected from the light projection element 23 by the drive circuit 24 (#113). Then the second light receiving sensor 4 is selected by the light receiving sensor selection circuit 21 (#114), output currents of the second light receiving sensor 4 are detected (#115), and distance information is calculated by the distance measurement calculation circuit 25 (#116), completing the distance measurement.

In the present embodiment as described, the operation of distance measurement is first performed by the first light receiving sensor 1 composed of PSD. A further distance measurement is carried out by the third light receiving sensor 7, 8 composed of SPC's in the case of a far distance object, while the measurement is carried out by the second light receiving sensor 4 composed of PSD in the case of a near distance object thus, improving the distance measurement accuracy in the entire region from near to far.

Figure 6:
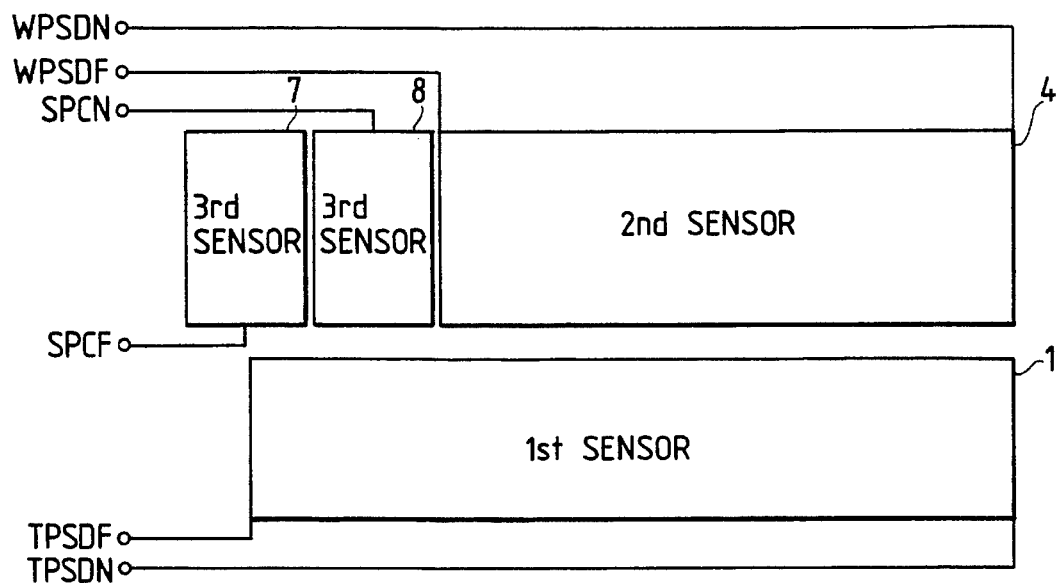
FIG. 6 is an outline drawing to show the second embodiment of arrangement of the light receiving sensors according to the present invention.

FIG. 6 shows the second embodiment of the arrangement of the light receiving sensors, in which the first light receiving sensor 1 is improved to increase the distance measurement accuracy, covering the entire distance range from near to far.

In the second embodiment, such an arrangement is effected for the purpose that the first light receiving sensor 1 of the above first embodiment is shortened on the far side as shown in FIG. 6. As seen from FIG. 3, a ratio of output currents of the light receiving sensor changes greater for a light reception position change of the received light spot image as a length of sensor becomes shorter. Thus the shortening of sensor results in a clear detection of a position change of the received light spot image, whereby further improving the distance measurement accuracy.

Specifically, since the distance measurement of far side is conducted by the third light receiving sensor 7, 8, the first light receiving sensor 1 does not have to receive the received light spot image of far distance side. Therefore, the first light receiving sensor 1 of the present embodiment is arranged to have a length appropriate to output data necessary for switching into the third light receiving sensor 7, 8.

The other structure is the same as in the above first embodiment, and therefore further explanation is omitted.

Figure 7:
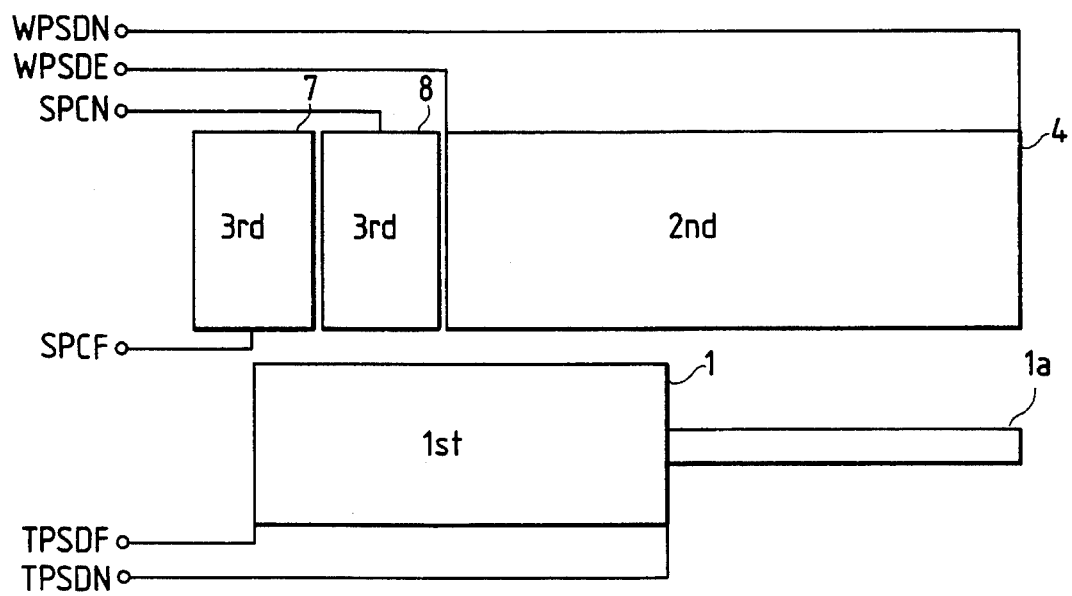
FIG. 7 is an outline drawing to show the third embodiment of arrangement of the light receiving sensors according to the present invention.

FIG. 7 shows the third embodiment of the light receiving sensors, in which the first light receiving sensor 1 of FIG. 6 is further improved to further increase the distance measurement accuracy, covering the entire distance range.

In the third embodiment, in addition to the arrangement of the second embodiment FIG. 6, the first light receiving sensor 1 is shortened on the near distance side up to a length appropriate to switch into the second light receiving sensor and a complementary light receiving sensor 1a is provided there simply for judging whether an object exists on the near distance side, from the view point that the first light receiving sensor 1 does not have to measure a distance on the near distance side because the second light receiving sensor 4 conducts distance measurement on the near distance side, but that it needs to judge whether switching either into the second light receiving sensor 4 or into the third light receiving sensor 7, 8 is appropriate where there is no object in the middle distance range.

This arrangement permits a remarkable improvement in the distance measurement accuracy of the first light receiving sensor while improving the distance measurement accuracy from far to near distance range.

The other structure of the third embodiment is the same as in the first and the second embodiments, and therefore further explanation is omitted.

In the above embodiments, the first light projection means 22 corresponds to the first signal projection means as claimed, the second light projection means 23 to the second signal projection means, the first light receiving sensor 1 to the first signal receiving means, the second light receiving sensor 4 to the second signal receiving means, and the third light receiving sensor 7, 8 to the third signal receiving means.

The fourth embodiment is a further improvement in arrangement on the first, the second, and the third embodiments of the present invention.

Figure 8:
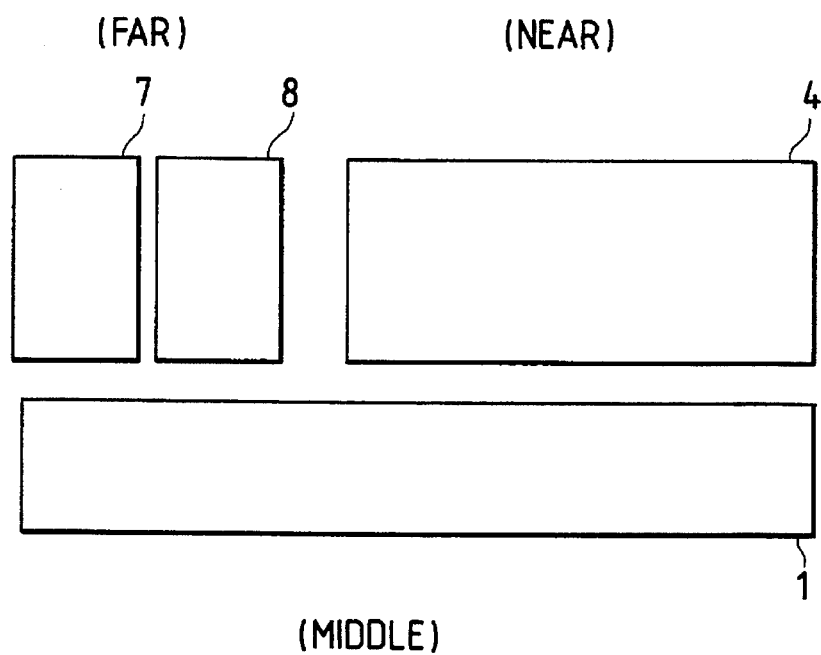
FIG. 8 is a drawing to show an arrangement of the respective sensors in the first embodiment.
Figure 9:
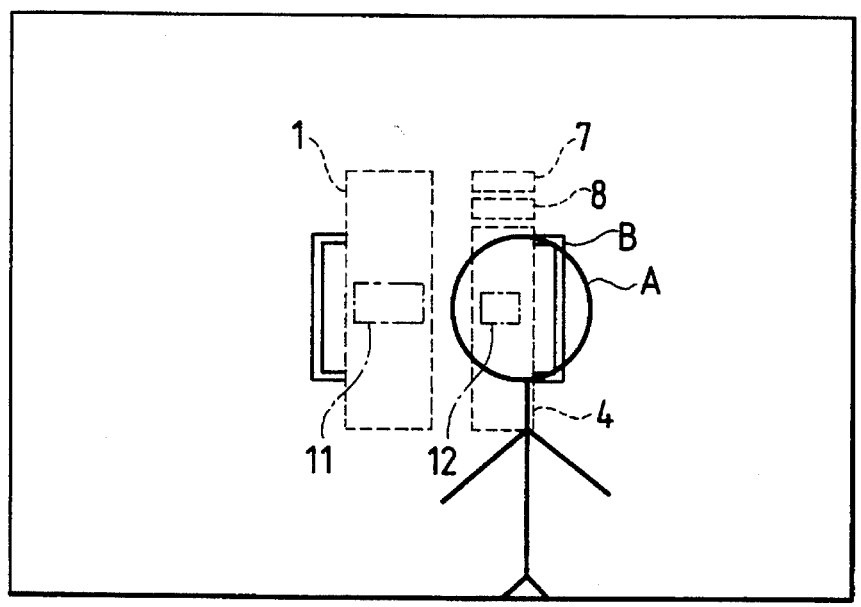
FIG. 9 is a drawing to illustrate a problem of parallax in a distance measuring apparatus having plural points of distance measurement.

FIG. 8 schematically shows the arrangement of sensors in the distance measuring apparatus of such a type as the first embodiment. The arrangement as shown in FIG. 8 includes the plural sensors of the first light receiving means 1 and of the second light receiving means 4 and the third light receiving means 7, 8, which has two distance measuring points 12, 11 (spot images of projection light reflected by a subject) as shown in FIG. 9. This arrangement could cause an offset due to parallax. For example, suppose a subject A exists at a distance of "2 m". There could be caused such problems as an inability to measure distance, and distance measurement with values having poor accuracy if the first light receiving means 1, in spite of the fact that the subject A is at a distance which the first light receiving means 1 having the distance measurable range of 1.2–3 m can measure, cannot detect the distance because of the arrangement of the sensors, but only the second light receiving means 4 and the third light receiving means 7, 8 can detect it. In FIG. 9, B represents a distance measurement mark.

The fourth embodiment intends to extend an improvement in the present invention, providing a solution to the above-described problems.

The fourth embodiment has the same structure of distance measuring apparatus, the same structure of sensors, and the same properties of sensors as the first embodiment as shown in FIGS. 1–4.

Figure 10:
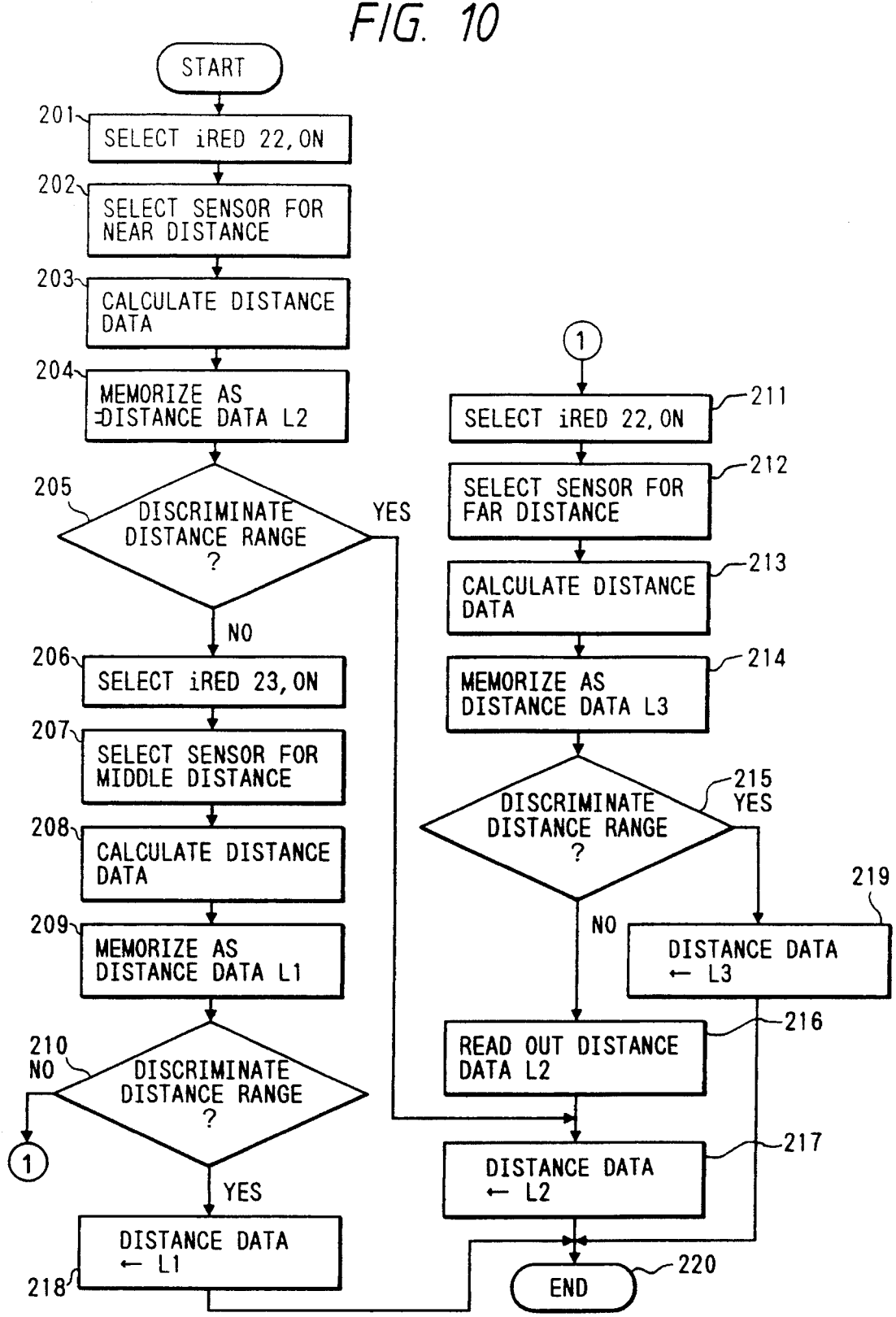
FIG. 10 is a flowchart to show an operation of distance measuring apparatus in the fourth embodiment of the present invention.

FIG. 10 is a flowchart to show an operation of the circuit of FIG. 4, which is executed by the control circuit 26 in FIG. 4. The operation for obtaining distance information in the fourth embodiment is explained in the following with reference to FIG. 10.

Step 201: To select and light an iRED 22 for near distance measurement.

Step 202: To select the second light receiving means 4, which is a sensor for near distance measurement.

Step 203: To take in and calculate a distance measurement datum from the second light receiving means 4.

Step 204: To store a calculation result in Step 203 as a distance datum L2.

Step 205: To Judge whether an object is within the near distance range, in which the second light receiving means 4 can perform accurate distance measurement. If the object is within the near distance range, the flow goes to Step 217, while if the object is out of the near distance range, to Step 206.

Step 206: To select and light an iRED 23 for middle distance measurement.

Step 207: To select the first light receiving means 1, which is a sensor for middle distance measurement.

Step 208: To take in and calculate a distance measurement datum from the first light receiving means 1.

Step 209: To store a calculation result in Step 208 as a distance datum L1.

Step 210: To judge whether an object is within the middle distance range, in which the first light receiving means 1 can perform accurate distance measurement. If the object is within the middle distance range, the flow goes to Step 218, while if the object is out of the middle distance range, to Step 211.

Step 211: To select and light the iRED 22 for far distance measurement.

Step 212: To select the third light receiving means 7, 8, which is a sensor for far distance measurement.

Step 213: To take in and calculate a distance measurement datum from the third light receiving means 7, 8.

Step 214: To store a calculation result in Step 213 as a distance datum L3.

Step 215: To judge whether an object is within the far distance range, in which the third light receiving means 7, 8 can perform accurate distance measurement. If the object is within the far distance range, the flow goes to Step 219, while if the object is out of the far distance range, to Step 216.

Step 216: To read the stored distance data L2, which is a distance datum somewhat better among the three data by the three sensors, to avoid an inability i in distance measurement, which may result because an object is not within any of the accurate distance measurable ranges. There is a high probability of existence of an object between the third light receiving means 7, 8 and the second light receiving means 4 in this case.

Step 217: To employ the distance datum L2 stored in Step 204 as a final distance datum.

If an object is within the near distance range in Step 205, the flow proceeds to Step 217 as explained to read the distance datum L2 stored in Step 204 and employ it as a final distance datum.

If an object is within the middle distance range in Step 210, the flow proceeds to Step 218 as explained.

Step 218: To read the distance datum L1 stored in Step 209 and employ it as a final distance datum.

If an object is within the far distance range in Step 215, the flow proceeds to Step 219 as explained.

Step 219: To read the distance datum L3 stored in Step 214 and employ it as a final distance datum.

Step 220: To conclude the series of steps for operation of distance measurement.

As described, the sequential distance measurement is carried out with the three sensors in the present embodiment. If none of the sensors is available for accurate distance measurement, a final distance datum is determined to be the distance datum L2 of the second light receiving means 4 for near distance, which is presumably a datum having somewhat better accuracy. This prevents to some extent a reduction in distance measurement accuracy in the distance measurement apparatus with parallax or with a plurality of measuring points.

Figure 11:
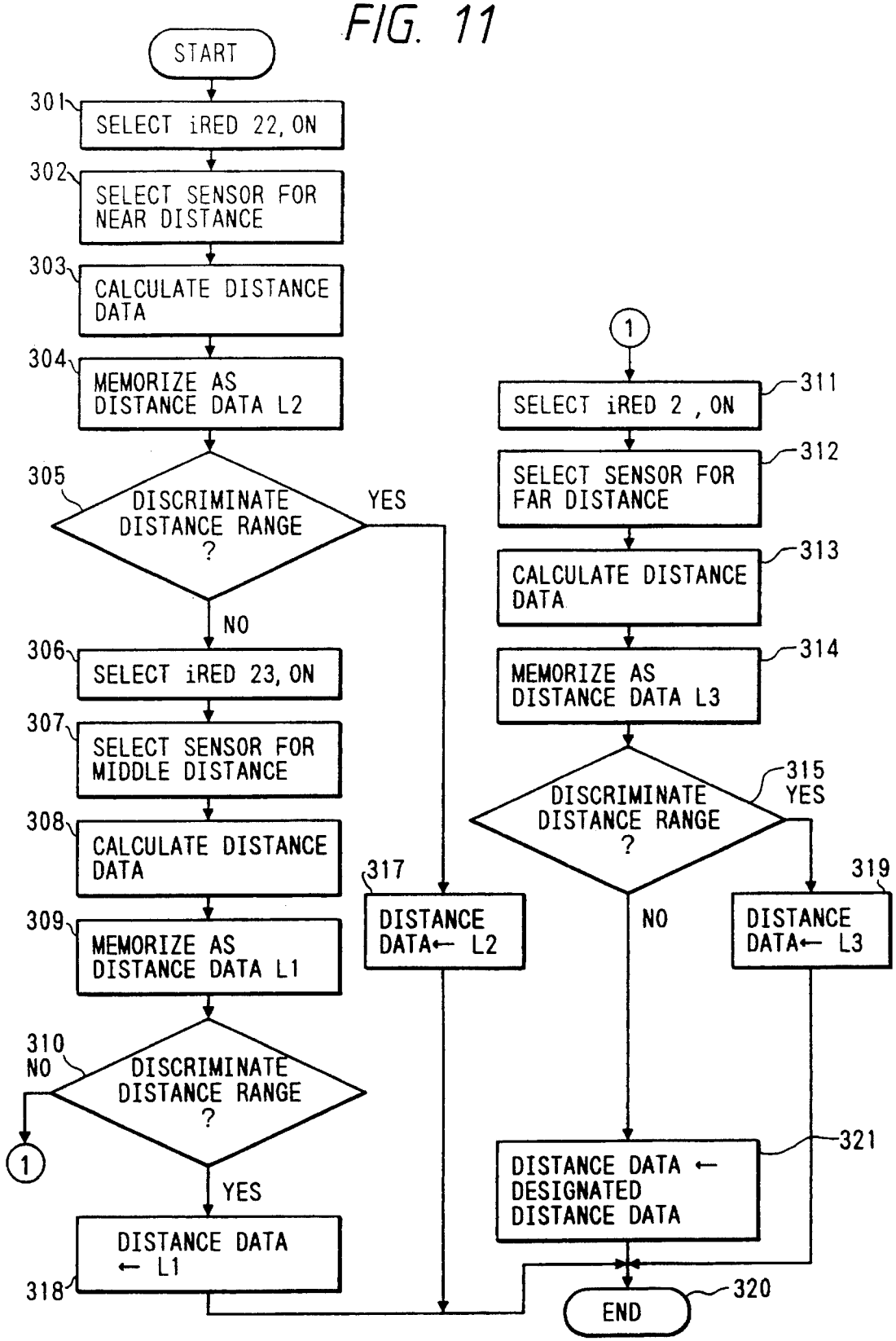
FIG. 11 is a flowchart to show an operation of distance measuring apparatus in the fifth embodiment of the present invention.

FIG. 11 is a flowchart to show an operation of distance measurement in the fifth embodiment of the present invention. The fifth embodiment is explained below with reference to the flowchart. The two lowest digits in the following step numbers are made coincident with those in the operation of FIG. 10.

Step 301: To select and light an iRED 22 for near distance measurement.

Step 302: To select the second light receiving means 4, which is a sensor for near distance measurement.

Step 303: To take in and calculate a distance measurement datum from the second light receiving means 4.

Step 304: To store a calculation result in Step 303 as a distance datum L2.

Step 305: To judge whether an object is within the near distance range. If the object is within the near distance range, the flow goes to Step 317, while if the object is out of the near distance range, to Step 306.

Step 306: To select and light an iRED 23 for middle distance measurement.

Step 307: To select the first light receiving means 1, which is a sensor for middle distance measurement.

Step 308: To take in and calculate a distance measurement datum from the first light receiving means 1.

Step 309: To store a calculation result in Step 308 as a distance datum L1.

Step 310: To judge whether an object is within the middle distance range. If within the middle distance range, the flow goes to Step 318, while if out of the middle distance range, to Step 311.

Step 311: To select and light the iRED 22 for far distance measurement.

Step 312: To select the third light receiving means 7, 8, which is a sensor for far distance measurement.

Step 313: To take in and calculate a distance measurement datum from the third light receiving means 7, 8.

Step 314: To store a calculation result in Step 313 as a distance datum L3.

Step 315: To judge whether an object is within the far distance range. If the object is within the far distance range, the flow goes to Step 319, while if out of the far distance range, to Step 321.

Step 321: To assign a designated distance datum as a final distance datum, considering a high probability exists that an object is between the distance measurable ranges of the second light receiving means 24 and of the third light receiving means 7, 8 from the arrangement of the sensors. The designated distance datum is a datum of "2 m", if the distance datum measurable ranges of the second light receiving means 4 and the third light receiving means 7, 8 are "0.5–1.2 m" and "3 m–∞", respectively.

If an object is within the near distance range in Step 305, the flow proceeds to Step 317 as explained.

Step 317: To employ the distance datum L2 stored in Step 304 as a final distance datum.

If an object is within the middle distance range in Step 310, the flow proceeds to Step 318 as explained.

Step 318: To read the distance datum L1 stored in Step 309 and employ it as a final distance datum.

If an object is within the far distance range in Step 315, the flow proceeds to Step 319 as explained.

Step 319: To read the distance datum L3 stored in Step 314 and employ it as a final distance datum.

Step 320: To conclude the series of steps for operation of distance measurement.

As described, the sequential distance measurement is carried out with the three sensors in the present embodiment. If neither of the sensors is available for accurate distance measurement, a final distance datum is determined to be the designated distance datum preliminarily set. This prevents a reduction in distance measurement accuracy in the distance measurement apparatus with parallax.

Figure 12:
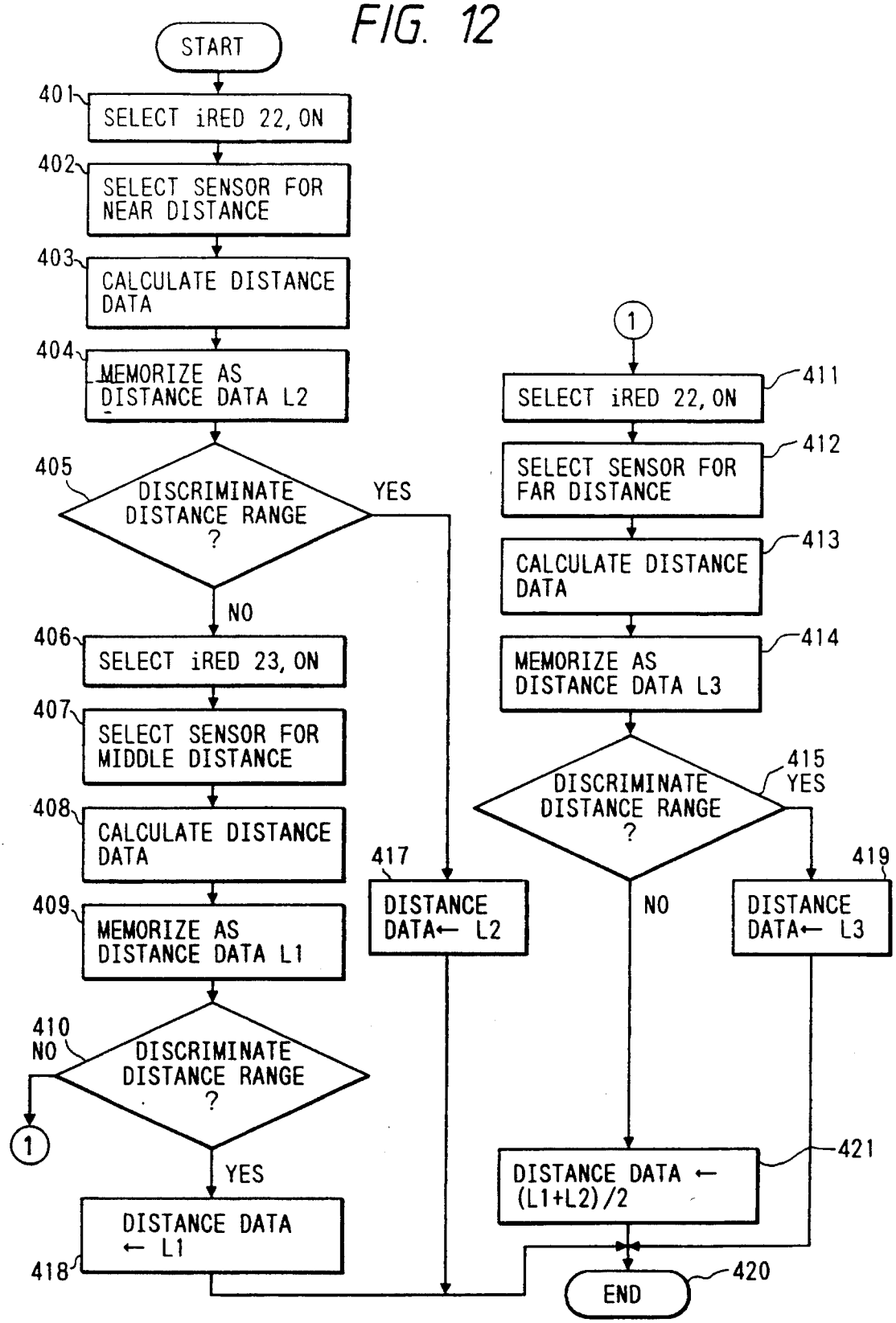
FIG. 12 is a flowchart to show an operation of distance measuring apparatus in the sixth embodiment of the present invention.

FIG. 12 is a flowchart to show an operation of distance measurement in the sixth embodiment of the present invention. The sixth embodiment is explained below with reference to the flowchart. The two lowest digits in the following step numbers are made coincident with those in the operation of FIG. 10.

Step 401: To select and light on an iRED 22 for near distance measurement.

Step 402: To select the second light receiving means 4, which is a sensor for near distance measurement.

Step 403: To take in and calculate a distance measurement datum from the second light receiving means 4.

Step 404: To store a calculation result in Step 403 as a distance datum L2.

Step 405: To judge whether an object is within the near distance range. If the object is within the near distance range, the flow goes to Step 417, while if the object is out of the near distance range, to Step 406.

Step 406: To select and light an iRED 23 for middle distance measurement.

Step 407: To select the first light receiving means 1, which is a sensor for middle distance measurement.

Step 408: To take in and calculate a distance measurement datum from the first light receiving means 1.

Step 409: To store a calculation result in Step 408 as a distance datum L1.

Step 410: To judge whether an object is within the middle distance range. If the object is within the middle distance range, the flow goes to Step 418, while if the object is out of the middle distance range, to Step 411.

Step 411: To select and light the iRED 22 for far distance measurement.

Step 412: To select the third light receiving means 7, 8, which is a sensor for far distance measurement.

Step 413: To take in and calculate a distance measurement datum from the third light receiving means 7, 8.

Step 414: To store a calculation result in Step 413 as a distance datum L3.

Step 415: To judge whether an object is within the far distance range. If the object is within the far distance range, the flow goes to Step 419, while if the object is out of the far distance range, to Step 421.

Step 421: To evaluate and calculate the distance data L1, L2, considering a high probability exists that an object is between the distance measurable ranges of the first light receiving means 1 and of the second light receiving means 4, from the arrangement of the sensors. A calculation result is employed as a final distance datum.

As the evaluation and calculation, an arithmetic mean of the distance data L1, L2 provided may provide a good result. The arithmetic mean is:

$$L=(L1+L2)/2.$$

Another method to calculate a final distance datum is to calculate the following value L with a greater weight $g_1$ on L1 and a lighter weight $g_2$ on L2 if the distance datum L1 is close to the near distance range, using a table:

$$L=g_1 \times L1 + g_2 \times L2.$$

If an object is within the near distance range in Step 405, the flow proceeds to Step 417 as explained.

Step 417: To employ the distance datum L2 stored in Step 404 as a final distance datum.

If an object is within the middle distance range in Step 410, the flow proceeds to Step 418 as explained.

Step 418: To read the distance datum L1 stored in Step 409 and employ it as a final distance datum.

If an object is within the far distance range in Step 415, the flow proceeds to Step 419 as explained.

Step 419: To read the distance datum L3 stored in Step 414 and employ it as a final distance datum.

Step 420: To conclude the series of steps for operation of distance measurement.

As described, the sequential distance measurement is carried out with the three sensors in the present embodiment. If none of the sensors is available for accurate distance measurement, a final distance datum is determined to be the distance datum calculated from the distance data obtained by the first light receiving means 1 for middle distance and by the second light receiving means 4 for near distance.

This prevents a reduction in distance measurement accuracy in the distance measurement apparatus with parallax.

In the description above, several embodiments have been described having three light receiving means. However, it would be apparent that the embodiment is applicable to a case where a different number, for example, two, light receiving means are provided.

What is claimed is:

1. A distance measuring apparatus comprising:

first light projecting means for projecting a light to a projection range;

first light receiving means, arranged along a base length direction thereof, for receiving a reflection light of the light projected from said first light projecting means, said first light receiving means having a first position sensor to detect, in accordance with a position of light reception, a distance to an object, the object being located at least within a middle distance range;

second light projecting means, provided independent of said first light projecting means, for projecting a light to substantially the same projection range as said first light projecting means; and second light receiving means, arranged in a direction different from the base length direction of said first light receiving means, for receiving a reflection light of the light projected from said second light projecting means, said second light receiving means including (i) a second position sensor to detect, in accordance with a position of light reception, a distance to an object, the object being located at least within a near distance range, and (ii) a third sensor, disposed at a position corresponding to light reception for an object which is located within a far distance range, to detect a distance to the object in the far distance range.

2. A distance measuring apparatus according to claim 1, wherein said second position sensor detects a distance to the object when the object is located on a side nearer than the middle distance range.

3. A distance measuring apparatus according to claim 1, wherein said third sensor detects a distance to the object when the object is located on a side farther than the middle distance range.

4. A distance measuring apparatus according to claim 1, further comprising control means for controlling said first position sensor, said second position sensor, and said third sensor to detect a distance in a time series.

5. A distance measuring apparatus according to claim 1, wherein said second position sensor and said third sensor are positioned substantially in alignment with the base length direction of said first light receiving means.

6. A distance measuring apparatus according to claim 1, wherein each of said first and second light projecting means comprises a LED as a light projection element.

7. A distance measuring apparatus according to claim 1, wherein said third sensor comprises a silicon photo cell.

8. An apparatus according to claim 1, wherein said second light receiving means is arranged in a direction substantially perpendicular to the base length direction of said first light receiving means.

9. A distance measuring apparatus comprising:

first signal projecting means for projecting a first signal to a projection range;

first signal receiving means, arranged in a base length direction thereof, for receiving a reflection signal of the first signal to measure a distance to an object which is located at least within a middle distance range;

second signal projecting means, provided independent of said first signal projecting means, for projecting a second signal to substantially, the same projection range as said first signal projecting means;

second signal receiving means for receiving a reflection signal of the second signal to measure a distance to an object when the object is located at least within a near distance range; and third signal receiving means for receiving a reflection signal of the second signal to measure a distance to an object when the object is located at least within a far distance range, said second signal receiving means and third signal receiving means being arranged in a direction different from the base length direction of said first signal receiving means.

10. A distance measuring apparatus according to claim 9, further comprising judging means for judging whether a distance datum measured by each of said first, second, and third signal receiving means is within a measurement range of the respective signal receiving means, said judging means judging a distance datum present within the measurement range of the respective signal receiving means to be a final distance datum.

11. A distance measuring apparatus according to claim 10, wherein a distance datum obtained by a predetermined one of said first, second, and third signal receiving means is used as a final distance datum when said judging means judges that none of the distance data measured by said first, second, and third signal receiving means is present within the measurement range of the respective signal receiving means.

12. A distance measuring apparatus according to claim 10, wherein a predetermined distance datum is used as a final distance datum when said judging means judges that none of the distance data measured by said first, second, and third signal receiving means is present within the measurement range of the respective signal receiving means.

13. A distance measuring apparatus according to claim 10, wherein a distance datum according to distance data obtained by a predetermined at least two of said first, second, and third light receiving means is used as a final distance datum when said judging means judges that none of the distance data measured by said first, second, and third light receiving means is present within the measurement range of the respective signal receiving means.

14. A distance measuring apparatus according to claim 9, further comprising control means for controlling said first, second, and third signal receiving means to measure a signal in a time series.

15. A distance measuring apparatus according to claim 9, wherein said second and third signal receiving means are positioned substantially in alignment with the base length direction of said first signal receiving means.

16. A distance measuring apparatus according to claim 9, wherein each of said first and second signal projecting means comprises a LED as a signal projection element.

17. A distance measuring apparatus according to claim 9, wherein said third signal receiving means comprises a silicon photo cell.

18. An apparatus according to claim 9, wherein said second signal receiving means is arranged in a direction substantially perpendicular to the base length direction of said first signal receiving means.

19. A distance measuring apparatus, comprising:

first projection means for projecting a first signal to a projection range;

first sensor means, arranged along a base length direction thereof, for measuring a first distance range by receiving a reflection signal of the first signal;

second projection means, provided independent of said first projection means, for projecting a second signal to substantially the same projection range as said first projection means; and second sensor means for measuring a second distance range different than the first distance range by receiving a reflection signal of the second signal, said second sensor means being arranged in a direction different from the base length direction of said first sensor means.

20. A distance measuring apparatus according to claim 19, further comprising discrimination means for discriminating whether respective distance data obtained by said first and second sensor means is within a range of the respective sensor means, said discrimination means setting as a final distance data, distance data which is within the measuring range of the respective sensor means which produced the distance data.

21. A distance measuring apparatus according to claim 20, wherein, when said discrimination means discriminates that no distance data measured by any of said first and second sensor means is within the measuring range of the respective sensor means, a distance data obtained by a predetermined one of said first and second sensor means is set as the final distance data.

22. A distance measuring apparatus according to claim 20, wherein, when said discrimination means discriminates that no distance data measured by any of said first and second sensor means is within the measuring range of the respective sensor means, a previously set predetermined distance data is used as the final distance data.

23. A distance measuring apparatus according to claim 20, wherein when said discrimination means discriminates that no distance data measured by any of said first and second sensor means is within the measuring range of the respective sensor means, a distance data corresponding to distance data obtained by a predetermined number of said first and second sensor means is set as the final distance data.

24. A distance measuring apparatus according to claim 19, wherein said second sensor means is arranged in a direction substantially perpendicular to the base length direction of said first sensor means.

25. An apparatus according to claim 19, wherein said second sensor means includes (i) a first sensor arranged in a position where near distance measurement for an object can be effected, and (ii) a second sensor arranged in a position where far distance measurement for an object can be effected, said first and second sensors being arranged in alignment with the base length direction of said first sensor means.

26. A distance measuring apparatus for measuring a distance to an object by projecting a signal toward the object and receiving the signal reflected by the object, comprising:

(a) first signal receiving means for receiving the signal reflected by the object, and for outputting, when the object is within a first distance range, a signal corresponding to the distance to the object; and (b) second signal receiving means for receiving the signal reflected by the object, and for outputting, when the object is within a second distance range which does not overlap the first distance range, a signal corresponding to the distance to the object, said second signal receiving means being a different signal receiving type from said first signal receiving means.

27. An apparatus according to claim 26, wherein the second distance range is further from the apparatus than the first distance range.

28. An apparatus according to claim 26, wherein said second signal receiving means is disposed substantially in alignment with said first signal receiving means in a base length direction of said first signal receiving means.

29. An apparatus according to claim 26, wherein said first and second signal receiving means are disposed such that the base length direction of each signal receiving means is substantially the same.

30. An apparatus according to claim 26, further comprising a projection means for projecting a signal toward the object, said first and second signal receiving means receiving the signal projected by said projection means and reflected by the object.

31. An apparatus according to claim 26, wherein said first signal receiving means includes a semiconductor position detector.

32. An apparatus according to claim 26, wherein said second signal receiving means includes a silicon photo cell.

33. An apparatus according to claim 26, further comprising a third signal receiving means for receiving the signal reflected by the object, and for outputting, when the object is within a third distance range which includes a part of the first distance range and a part of second distance range, a signal corresponding to the distance to the object.

34. An apparatus according to claim 33, further comprising control means for activating either one of said first and second signal receiving means in accordance with an output of said third signal receiving means.

35. An apparatus according to claim 34, wherein said control means includes means for activating said first signal receiving means when said third signal receiving means outputs a signal representing that the object is within a near side portion of the third distance range, and for activating the second signal receiving means when said third signal receiving means outputs a signal representing that the object is within a far side portion of the third distance range.

36. An apparatus according to claim 26, wherein said apparatus is disposed in a camera.

37. An apparatus according to claim 26, wherein said apparatus is disposed in an optical device.

38. A distance measuring apparatus for measuring a distance to an object by projecting a signal toward the object and receiving the signal reflected by the object, comprising:

(a) first signal receiving means for receiving the signal reflected by the object, and for outputting, when the object is within a first distance range, a signal corresponding to the distance to an object;

(b) second signal receiving means for receiving the signal reflected by the object, and for outputting, when the object is within a second distance range which does not overlap the first distance range, a signal corresponding to a distance to the object; and (c) processing means for processing an output of said first signal receiving means and an output of said second signal receiving means, said processing means processing the output of said second signal receiving means with different processing step from the processing of the output of said first signal receiving means.

39. An apparatus according to claim 38, wherein said first signal receiving means includes a semiconductor position detector.

40. An apparatus according to claim 38, wherein said second signal receiving means includes a silicon photocell.

41. An apparatus according to claim 38, wherein said apparatus is disposed in a camera.

42. An apparatus according to claim 38, wherein said apparatus is disposed in an optical device.

43. A distance measuring apparatus for measuring a distance to an object by projecting a signal toward the object and receiving the signal reflected by the object, comprising:

(a) first signal receiving means for receiving, when the object is within a first distance range, the signal reflected by the object;

(b) second signal receiving means for receiving, when the object is at least on a near distance side with respect to the first distance range, the signal reflected by the object, a portion of said second signal receiving means receiving the signal reflected by the object when the object is at least on the near distance side, said portion being located at a position spaced apart from a direction along which the signal incident on said first signal receiving means moves when a distance to the object changes.

44. An apparatus according to claim 43, wherein said first signal receiving means includes means for receiving the signal reflected by the object, and for producing a signal corresponding to the distance to the object.

45. An apparatus according to claim 44, wherein said second signal receiving means includes means for receiving the signal reflected by the object, and for producing a signal corresponding to the distance to the object.

46. An apparatus according to claim 43, further comprising first projection means for projecting a signal toward the object, said first signal receiving means receiving the signal projected by said first signal projection means and reflected by the object.

47. An apparatus according to claim 46, further comprising second projection means for projecting a signal toward the object, said second signal receiving means receiving the signal projected by said second signal projection means and reflected by the object.

48. An apparatus according to claim 43, further comprising control means for time-serially activating said first and second signal receiving means.

49. An apparatus according to claim 48, wherein said control means includes means for initially activating said first signal receiving means and, thereafter, activating said second signal receiving means in accordance with information obtained by said first signal receiving means.

50. An apparatus according to claim 43, wherein said first and second signal receiving means are disposed so that base length directions of each signal receiving means are substantially parallel.

51. An apparatus according to claim 43, wherein said first and second signal receiving means are disposed relatively parallel along their base length directions.

52. An apparatus according to claim 43, further comprising third signal receiving means for receiving, when the object is at least within far distance portion of the first distance range, the signal reflected by the object.

53. An apparatus according to claim 52, further comprising control means for time-serially activating said first, second, and third signal receiving means.

54. An apparatus according to claim 53, wherein said control means includes means for initially activating said first signal receiving means and, thereafter, activating one of said second signal receiving means and said third signal receiving means in accordance with information obtained by said first signal receiving means.

55. An apparatus according to claim 43, wherein said apparatus is disposed in a camera.

56. An apparatus according to claim 43, wherein said apparatus is disposed in an optical device.

57. A distance measuring apparatus, comprising:
(a) first projection means for projecting a first signal toward an object to measure a distance to the object;
(b) first signal receiving means for receiving the first signal projected by said first projection means and reflected by the object;
(c) second projection means for projecting a second signal toward the object to measure the distance to the object, said second projection means projecting the second signal in the same direction that the first projection means projects the first signal; and
(d) second signal receiving means for receiving the second signal projected by said second projection means and reflected by the object.

58. An apparatus according to claim 57, wherein said first signal receiving means includes means for receiving, when the object is within a first distance range, the signal projected by said first projection means and reflected by the object.

59. An apparatus according to claim 58, wherein said first signal receiving means includes means for receiving, when the object is within the first distance range, the signal reflected by the object, and for producing a signal corresponding to the distance to the object.

60. An apparatus according to claim 58, wherein said second signal receiving means includes means for receiving, when the object is within a second distance range which includes at least a portion of said first distance range, the signal projected by said second projection means and reflected by the object.

61. An apparatus according to claim 60, wherein said second signal receiving means includes means for receiving, when the object is within the second distance range, the signal reflected by the object, and for producing a signal corresponding to the distance to the object.

62. An apparatus according to claim 60, wherein said second distance range includes at least a near distance portion of the first distance range.

63. An apparatus according to claim 60, wherein said second distance range includes at least a far distance portion of the first distance range.

64. An apparatus according to claim 57, further comprising control means for time-serially activating said first and second signal receiving means.

65. An apparatus according to claim 64, wherein said control means includes means for initially activating said first signal receiving means and, thereafter, activating said second signal receiving means in accordance with information obtained by said first signal receiving means.

66. An apparatus according to claim 57, wherein said first and second signal receiving means are disposed so that base length directions of each signal receiving means are substantially parallel.

67. An apparatus according to claim 57, wherein said first and second signal receiving means are disposed relatively parallel along their base length directions.

68. An apparatus according to claim 57, further comprising third signal receiving means for receiving the signal projected by the second projection means and reflected by the object.

69. An apparatus according to claim 68, wherein said first signal receiving means includes means for receiving, when the object is within the first distance range, the signal project by said first projection means and reflected by the object, and wherein said third signal receiving means includes means for receiving, when the object is within a third distance range which is included in the first distance range but is not included in the second distance range, the signal projected by said second projection means and reflected by the object.

70. An apparatus according to claim 69, wherein the second distance range includes at least a near distance portion of the first distance range, and the third distance range includes at least far distance portion of the first distance range.

71. An apparatus according to claim 70, further comprising a control means for time-serially activating said first, second, and third signal receiving means.

72. An apparatus according to claim 71, wherein said control means includes means for initially activating said first signal receiving means and, thereafter, activating one of said second signal receiving means and said third signal receiving means in accordance with information obtained by said first signal receiving means.

73. An apparatus according to claim 57, further comprising control means for time-serially activating said first and second signal projection means.

74. An apparatus according to claim 57, wherein said apparatus is disposed in a camera.

75. An apparatus according to claim 57, wherein said apparatus is disposed in an optical device.

* * * * *

UNITED STATES PATENT AND TRADEMARK OFFICE
CERTIFICATE OF CORRECTION

PATENT NO. : 5,485,262
DATED : January 16, 1996
INVENTOR(S) : TSUNEMIYA, ET AL

It is certified that error appears in the above-indentified patent and that said Letters Patent is hereby corrected as shown below:

Column 1

Line 17, "type" should read --type,--; and
Line 32, "light" should be deleted.

Column 4

Line 18, "tile" should read --the--;
Line 27, "tile" should read --the--; and
Line 62, "tile" should read --the--.

Column 5

Line 50, "object thus," should read --object, thus--.

Column 7

Line 55, "i" should be deleted.

Column 11

Line 46, "substantially," should read --substantially--.

Column 13

Line 10, "wherein" should read --wherein,--.

Column 15

Line 29, "far" should read --the far--.

UNITED STATES PATENT AND TRADEMARK OFFICE
CERTIFICATE OF CORRECTION

PATENT NO. : 5,485,262
DATED : January 16, 1996
INVENTOR(S) : TSUNEMIYA, ET AL

It is certified that error appears in the above-indentified patent and that said Letters Patent is hereby corrected as shown below:

Column 16

Line 38, "project" should read --projected--; and
Line 48, "far" should read --the far--.

Signed and Sealed this

Sixth Day of August, 1996

Attest:

BRUCE LEHMAN

Attesting Officer

Commissioner of Patents and Trademarks